INVENTORS
Samuel S. LaRocco
Daniel B. Ventre
BY
Blair Cesari + St.Onge
ATTORNEYS

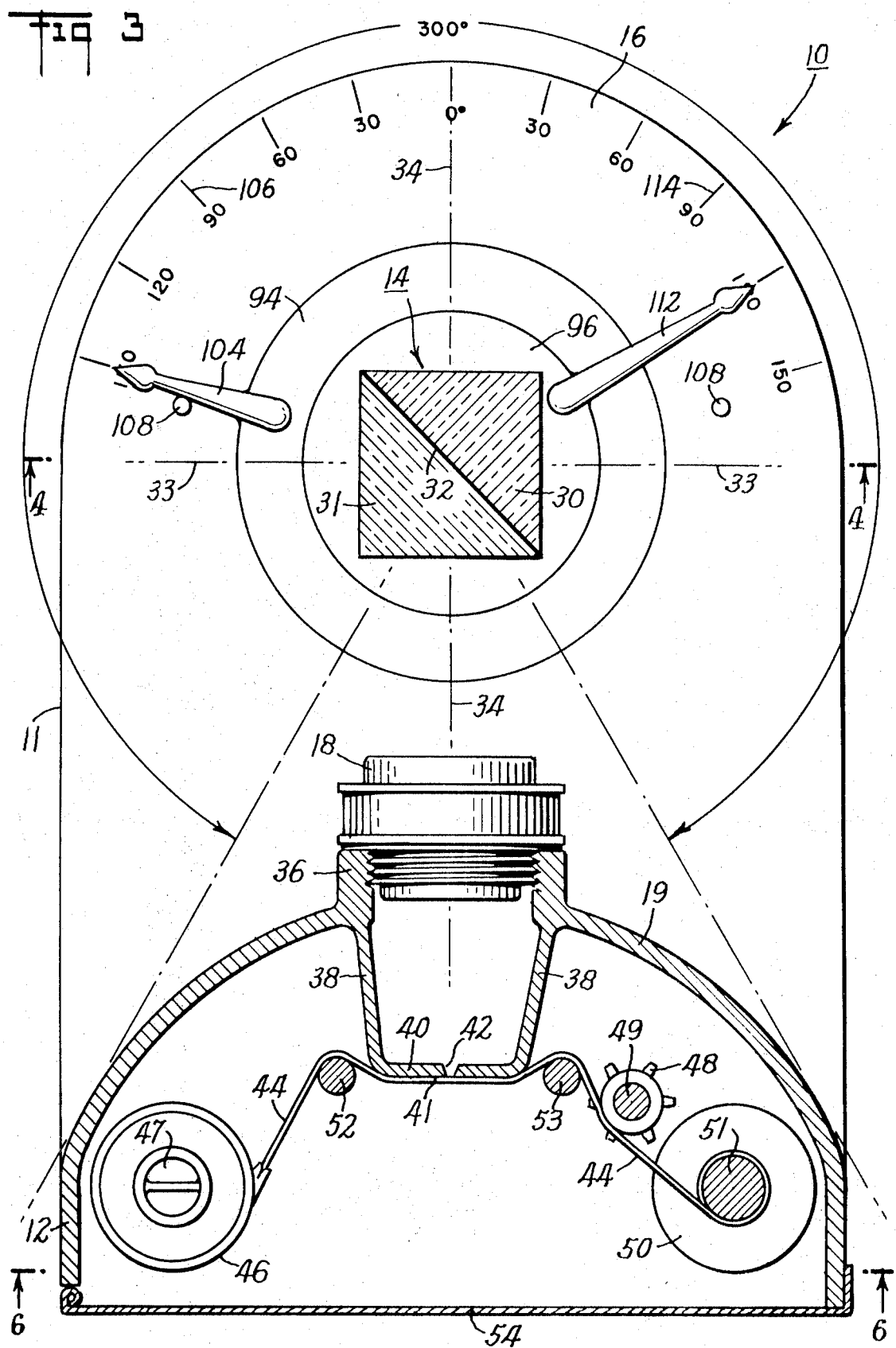

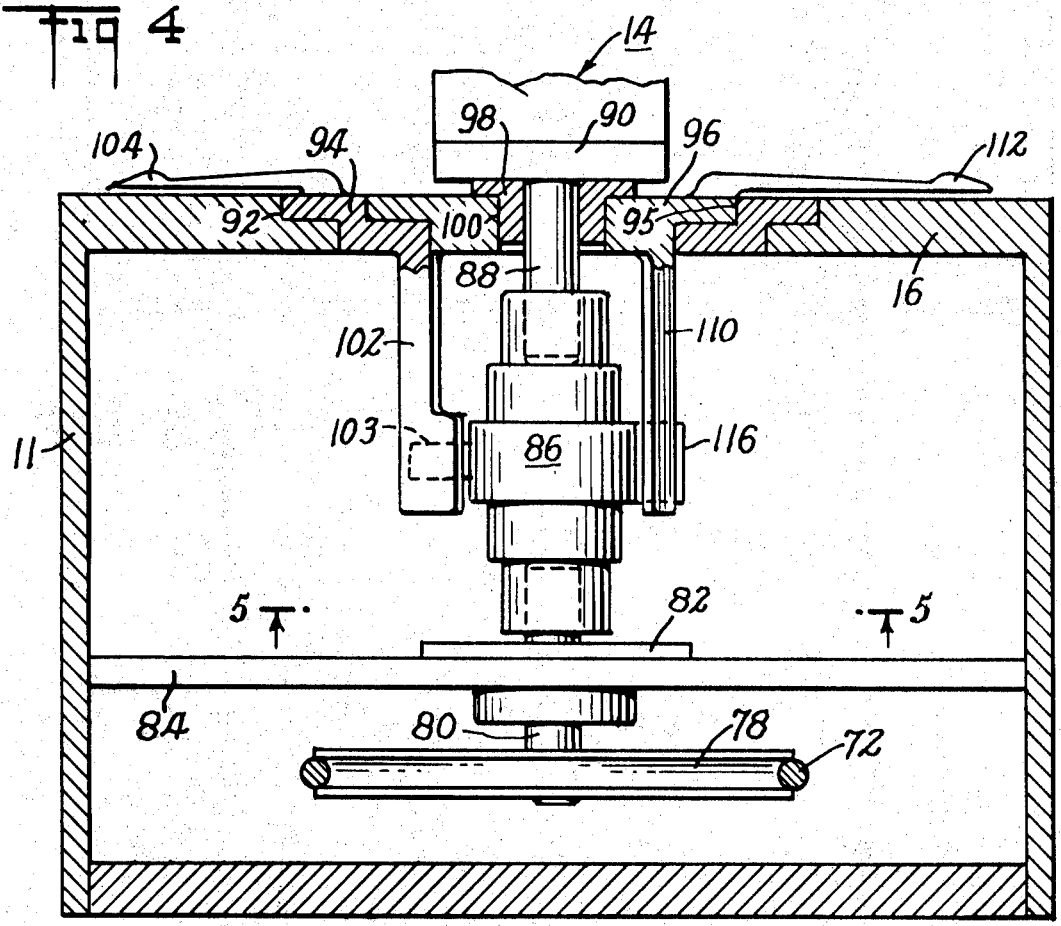
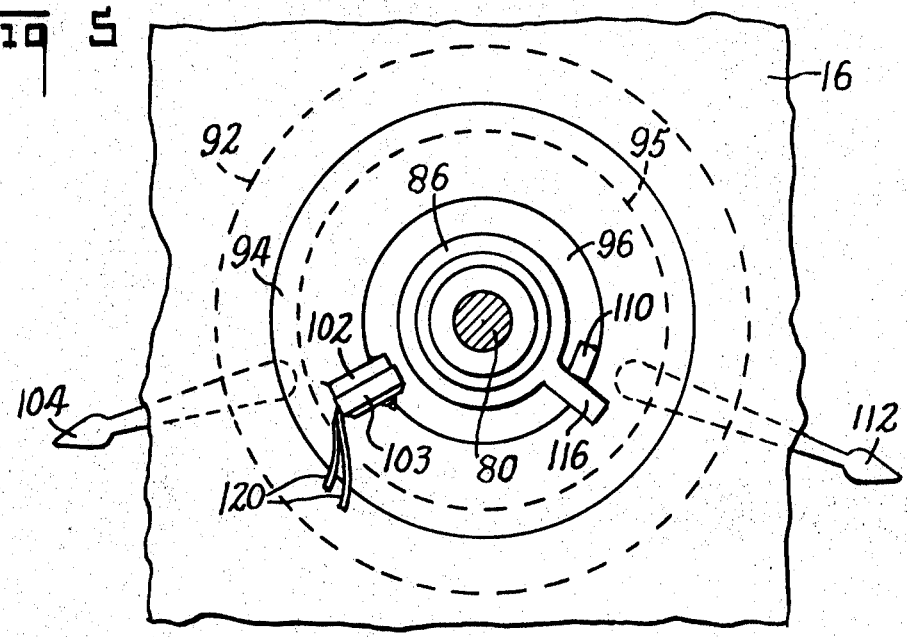

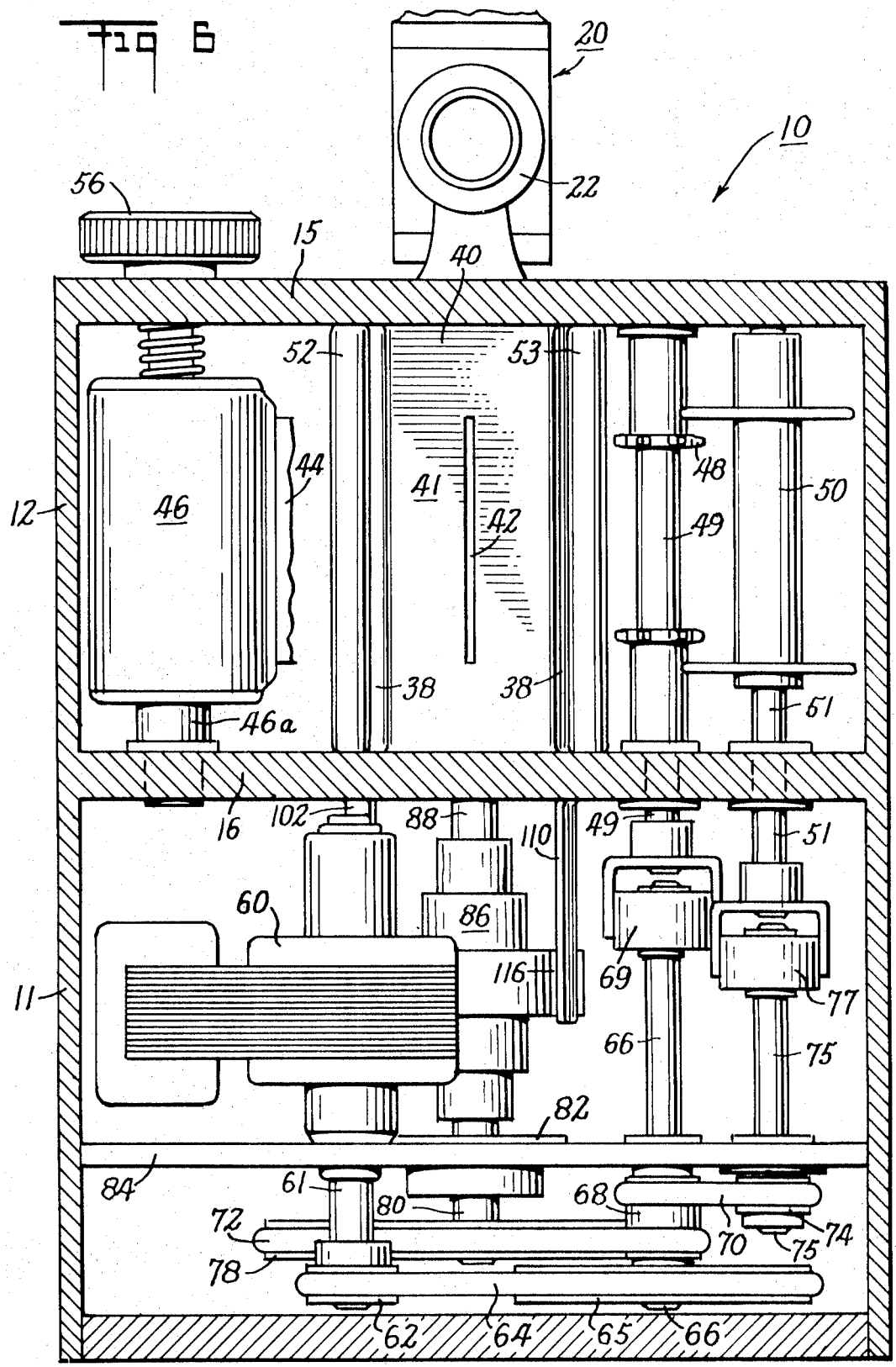

United States Patent Office 3,620,148
Patented Nov. 16, 1971

3,620,148
PANORAMIC CAMERA
Samuel S. La Rocco, 312 Thornridge Drive 06903, and Daniel B. Ventre, 24 Anderson St. 06851, both of Stamford, Conn.
Filed Oct. 20, 1969, Ser. No. 867,468
Int. Cl. G03b 37/00
U.S. Cl. 95—15
15 Claims

ABSTRACT OF THE DISCLOSURE

The disclosed panoramic camera includes a pair of optical scanners, each comprising two dove prisms back-to-back with a mirror interface. One scanner is associated with a viewfinder for determining the angle of the desired field of view, which angle may approach 300°. The other scanner is associated with the camera objective lens and is rotated in synchronism with the advance of film to scan the field of view. Physical stops are provided for adjustably establishing the starting and terminating points of the scan as determined by the viewfinder scanner.

BACKGROUND OF THE INVENTION

Various techniques have been developed for taking panoramic pictures of landscapes, and the like. For example, a series of overlapping pictures have been pieced together to provide a composite, panoramic picture. Also, in the manner of a movie camera, panoramic pictures have been made by sweeping a camera through a field of view while the film is being advanced. It has also been proposed to rotate the objective lens system of a camera about its rear nodal point to expose film wrapped on an arcuate surface through a slit moving in synchronism with the objective lens.

Using any of these techniques, panoramic pictures of a field of view including an angle up to 360° are possible. However, either relatively complex and expensive photographic equipment is required or considerable skill is involved in developing the film and composing the negatives.

Presently, the most widely used techniques for expanding the angle of a field of view is to employ wide angle lenses. Lenses are available which can encompass an angle of 100°. However, these lenses typically require apertures of at least $f11$ to $f16$ in order to obtain useful results. As a consequence, poorly lighted objects cannot be satisfactorily focused and composed. Complex and expensive wide angle lens systems have been developed which can work down to lens apertures of $f4$, but they can only encompass angles up to 75°. Moreover, wide angle lenses typically produce some image distortion near the edges of a field of view.

SUMMARY OF THE INVENTION

According to the present invention, there is provided a panoramic camera which efficiently overcomes many of the objections and drawbacks to prior panoramic cameras and panoramic picture-taking techniques. The panoramic camera of the invention is relatively inexpensive to manufacture, reasonably simple in design, and convenient to use. Significantly, the lack of complexity renders the invention quite suitable for use by individuals not particularly skilled in photography, much less panoramic photography. Moreover, the panoramic camera of the invention provides uniformly excellent image quality throughout the field at large lens apertures.

Pursuant to the invention, an optical scanner is employed for sweeping through a field of view which theoretically could cover an angle of 360°, but for the presence of the remaining camera structure. However, fields including angles of up to 300° are possible with the disclosed panoramic camera embodiment.

The optical scanner employed by the invention is preferably a double-dove scanner comprising two dove prisms back-to-back with their interface mirrored so as to be totally light reflective. Scanners of this type have been used in aerial photographic reconnaissance, but have not heretofore been used in conjunction with land based cameras.

Further in importance with the invention, a pair of like optical scanners are employed, one mounted for rotation in front of the camera objective lens system and the other mounted for rotation in front of a viewfinder telescope. The angle of the desired field of view is determined through the viewfinder by rotation of the viewfinder scanner. A suitable scale marked on the camera housing is provided to facilitate this determination. Having determined the starting and terminating points of the field, suitable stops are selectively positioned accordingly in order to establish the scanning arc of the objective scanner required to encompass the desired field.

After setting the objective optical scanner at one stop corresponding to the starting point of the desired field, it is rotated through to the terminating point stop in synchronism with the advance of film. The advancing film is exposed through a stationary elongated slit. A suitable motor is provided for rotating the objective optical scanner and advancing the film in synchronism.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIG. 3 is a sectional view taken along line 3—3 of FIG. 1;

FIG. 4 is a sectional view taken along line 4—4 of FIG. 3;

FIG. 5 is a sectional view taken along line 5—5 of FIG. 4; and

FIG. 6 is a sectional view taken along line 6—6 of FIG. 3.

Similar reference numerals refer to corresponding parts throughout the several views of the drawings.

DETAILED DESCRIPTION

Figure 1:
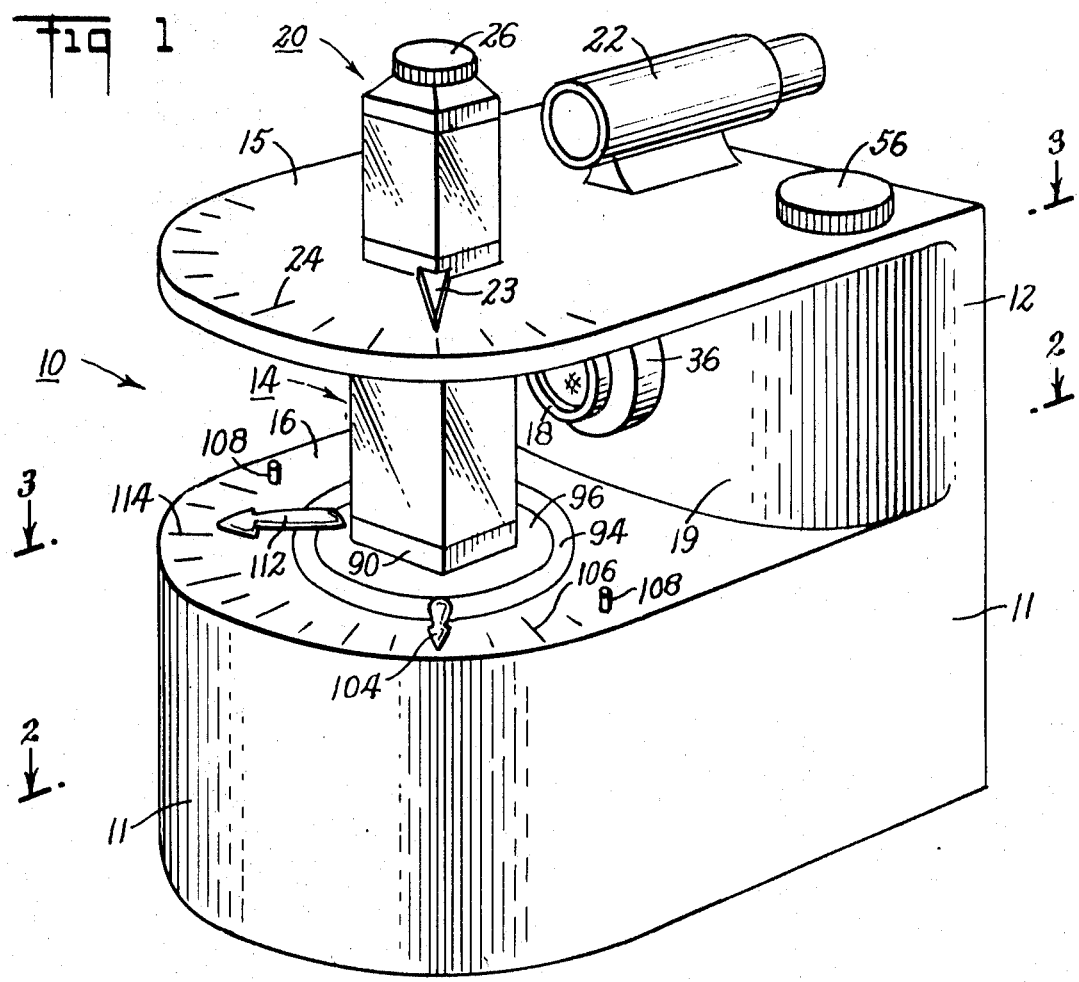
FIG. 1 is a perspective view of a panoramic camera constructed according to a preferred embodiment of the invention.

The panoramic camera of the invention includes a housing, generally indicated at 10, having an enlarged lower portion 11 and a smaller upper portion 12 for containing and mounting the various camera components. A first optical scanner, generally indicated at 14, is stationed between an upper ledge 15 extending horizontally from the top of upper body portion 12 and the top 16 of lower body portion 11. This positions the scanner 14 immediately in front of an objective lens system 18 of the camera mounted in the curved front wall 19 of the upper housing portion 12. As will be seen, the scanner 14 is mounted for rotation so as to scan a field of view through an angle up to 300°. The axis rotation of scanner 14 intersects the axis of lens 18 at a right angle such that collimated light from any sector of the field, depending upon the angular orientation of the scanner, is refracted and reflected to the camera lens symmetrically along the lens axis.

Mounted on ledge 15 coaxially above optical scanner 14 is a second like optical scanner, generally indicated at 20. Scanner 20 is journaled in ledge 15 for rotation about an axis aligned with the axis of rotation of scanner 14 such that they both are capable of scanning the same field. The two scanners are, however, independently rotatable. Scanner 20 is positioned immediately in front of a telescopic viewfinder 22 with its axis of rotation intersecting at a right angle the axis of the viewfinder lens such that the field to be photographed through objective scanner 14 can be composed by the photographer through scanner 20.

A pointer 23 movable with scanner 20 indicates on a scale 24 inscribed on the upper surface of ledge 15 the angular position of a particular sector of the field viewed through viewfinder 22 relative to the axis of the viewfinder. If the viewfinder axis and the axis of lens 18 are vertically aligned and parallel, then for corresponding angular positions of the like scanners 14 and 20, the sector of the field viewable through the viewfinder 22 is also viewable through the camera objective lens 18. As will be more fully described later, viewfinder scanner 20 is manually rotated through the facility of a knurled knob 26 secured to the top thereof in the clockwise direction to the right edge of the desired field to be photographed and then in the counterclockwise direction to the left edge thereof. The angular positions relative to the camera lens axis of the two edges of the desired field are read from scale 24. These readings provide angular information on the basis of which stops are adjustably positioned so as to determine the starting and terminating points for the rotation of objective scanner 14. In this manner, the rotational sweep of scanner 14 can be rather precisely determined so as to photograph only the desired field. Of course, during the composing and photographing of the desired field, the camera itself is held stationary, as, for example, on a tripod.

Referring now to FIG. 3, the optical scanner 14, in the illustrated embodiment, comprises a pair of dove prisms 30 and 31 cemented back-to-back, with their interface 32 silvered so as to provide a totally reflective surface. Scanner 20 is similarly constructed. In the orientation of scanner 14 shown in FIG. 3, parallel rays of light symmetrical about a centerline 33, 90° counterclockwise from the camera lens axis 34, are reflected by the scanner to the objective lens 18 symmetrically along the lens axis. As is illustrated in Hotchkiss, Pat. No. 3,217,623, a double-dove scanner requires only a physical rotation of 180° in order to scan a 360° field. However, due to the presence of the upper housing portion 12, the rear sector of the field, 30° on each side of the lens axis 34, is occluded. This leaves 300° as the angle of a field capable of being photographed by the disclosed panoramic camera embodiment. It will be appreciated that further streamlining of the camera housing will increase the angle of the field somewhat. It will also be appreciated that the scanner 14, regardless of its angular orientation, always directs light from the field to the lens 18 symmetrically along lens axis 34. Therefore, film imaging remains uniform through the field.

Still referring to FIG. 3, the camera objective lens 18 is threaded into a lens mount 36, integrally formed in the curved front wall 19 of the upper housing portion 12. The lens 18 may be a typical 35 millimeter lens system with an adjustable lens aperture ranging from $f2.8$ to $f22$. Since the typical application of the panoramic camera of the invention would be to photograph distant fields, the lens 18 may be fixed focused at infinity. It will be appreciated, however, that the panoramic camera of the invention may be adapted with manual or automatic focusing as well as automatic exposure adjustment.

Walls 38 extending rearwardly from each side of the lens mount support a film backing member 40 with its rearward surface 41 located precisely at the focal plane of the lens 18. As seen in FIGS. 3 and 6, a vertically elongated slit 42, aligned with the lens axis 34, is formed in the backing member 40. A film strip 44 is drawn over film backing surface 41 and exposed through slit 42 by a continuous succession of images reflected through lens 18 by the scanner 14 as it is rotated through the field.

The film 44 is drawn from a takeoff reel or film cartridge 46 (FIGS. 3 and 6) mounted on a shaft 46a by a capstan sprocket 48 driven from shaft 49 and wound on a takeup reel 50 mounted on a shaft 51. The film 44 passes around rollers 52 and 53 positioned on each side and forwardly of the film backing surface 41 so as to insure that the film is drawn tightly against the film backing surface. The upper ends of rollers 52 and 53 and shafts 49 and 51 are journalled in the top wall of housing portion 12 which is an extension of ledge 15. The lower ends of these elements as well as shafts 46a are journalled in a partition 55 separating housing portions 11 and 12. A cover 54 provides access to the upper housing portion 12 for film loading and unloading. A rewind knob 56 engages the spool 47 of cartridge 46 to facilitate rewinding the film 44 back into the cartridge after the film has been exposed.

Figure 2:
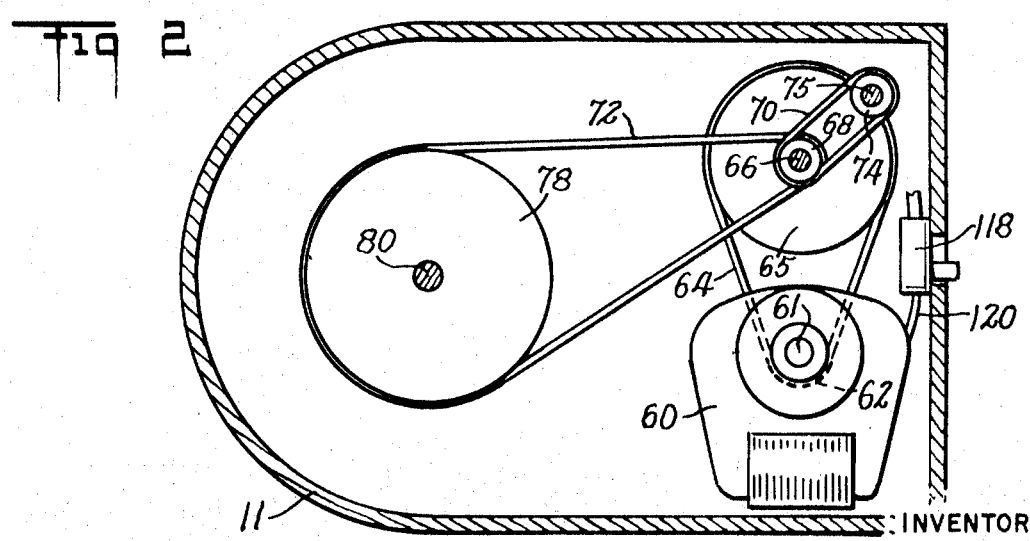
FIG. 2 is a sectional view taken along line 2—2 of FIG. 1.

Referring now to FIGS. 2 and 6, a motor 60 is provided for rotating scanner 14 in synchronism with the advancement of film 44. The motor may be spring driven, but preferably it is electrically powered from a battery pack (not shown), either accommodated in or external to the camera housing 10. The motor output shaft 61 is fitted with a pulley 62 which engages a belt 64 to drive a reduction pulley 65. Pulley 65 is keyed to a shaft 66, as is a smaller diameter pulley 68. Shaft 66 is coupled to the capstan sprocket drive shaft 49 by a suitable unidirectional clutch 69. This clutch couples the output drive of motor 60 to the capstan sprocket shaft 49 for rotation of the capstan sprocket 48 in a counterclockwise direction in order to draw film from the cartridge 46. Clutch 69 releases to permit the capstan sprocket to rotate freely in the clockwise direction so as to permit rewinding of the film 44 back into the cartridge 46. Since the lens 18 does not require a shutter, the lens must be capped during the rewinding of the film.

Pulley 68 is a doubletrack pulley accommodating a pair of belts 70 and 72. Belt 70 engages a pulley 74 of the same diameter as pulley 68. Pulley 74 is mounted on a shaft 75 which is coupled to the takeup reel shaft 51 through a unidirectional clutch 77 (FIG. 6). This clutch is preferably also adapted to slip and thus accommodate some slippage between the drive of capstan sprocket 48 and takeup reel shaft 51. This compensates for variations in the rotational rate of these two driven elements due to the buildup of film on the takeup reel 50. Like clutch 69, this clutch is also adapted to rotate freely in the opposite direction so as to permit rewinding of the film 44 back into cartridge 46.

Belt 72 drivingly connects pulley 68 to a large diameter pulley 78 which is keyed to a shaft 80. Shaft 80, as best seen in FIG. 4, is journalled in a bushing 82 fitted in a horizontal support bracket 84 mounted in the lower housing portion 11. Shafts 66 and 75 are similarly journalled in bracket 84. The upper end of shaft 80 is connected to the lower end of a unidirectional clutch 86. The upper end of this clutch connects to a shaft 88 which depends from a mounting plate 90 secured to the bottom of optical scanner 14. It is thus seen that when the motor 60 is energized, capstan sprocket 48 and takeup reel 50 are rotated in a counterclockwise direction to draw the film 44 past slit 42 while, in synchronism therewith, the scanner 14 is also rotated in the counterclockwise direction to scan the field.

Still referring to FIG. 4, the top 16 of lower housing portion 11 is provided with a stepped aperture 92 for seating a first ring 94. Ring 94 is in turn provided with a stepped central aperture 95, such as to seat a second ring 96. A bushing 98 is fitted in the central aperture 100 of ring 96 to journal shaft 88 for the rotation of scanner 14. Ring 94 is formed having a depending first stop 102 which is angularly positioned by rotation of the ring to adjustably establish the left edge of a particular field to be photographed. A first pointer 104 secured to ring 94 moves over a scale 106 inscribed on the upper surface of top 16 to indicate the angular position of the lefthand edge of the field relative to the lens axis 34 (FIG. 3). A post 108 engages pointer 104 to prevent the stop 102 from being rotated beyond the 150° position which would place the left edge of the field in the occluded 60° sector in back of the camera.

In similar fashion, ring 96 is provided with a second depending stop 110 which is adjustably positioned by rotation of this ring to establish the right edge of a particular field to be photographed. As previously noted, the edges of the field are determined by rotation of the viewfinder scanner 20 and reading off the angular positions of the edges on scale 24. A second pointer 112 secured to ring 96 moves over scale 114 to facilitate the positioning of stop 110 rather precisely at the right edge of the desired field. Similarly, pointer 112 encounters a post 108 to prevent positioning the stop 110 in the 60° sector occluded by the camera housing 10.

As perhaps best seen in FIG. 5, the stops 102 and 110 are engaged by a tab 116 secured to clutch 86 and revolved in unison with the rotation shaft 88. As shown in FIG. 5, tab 116 is in engagement with stop 110 which establishes the right edge of the field and also the starting point of the sweep or scan by scanner 14. Stop 102 then establishes the lefthand edge of the field and also the terminating point of the scan of scanner 14. Preferably, stop 102 mounts a normally closed microswitch 103 which when engaged by tab 116 at the completion of a scan opens to break the energization circuit for electric motor 60. To initiate a scan, a switch 118 (FIG. 2), included in the motor energization circuit represented by leads 120 and electrically in series with microswitch 103, is closed to supply current to the motor 60. The scanner is rotated through the field established by the stops 110 and 102 while the film 44 is advanced past slit 42 in synchronism therewith. At the left edge of the field, tab 116 engages microswitch 103 to de-energize motor 60, terminating the rotation of scanner 14 and the advancement of film 44. Switch 118 is opened, so that the scanner 14 can be reset to the position where tab 116 encounters stop 110. Clutch 86, being a unidirectional clutch, disengages shaft 88 from shaft 80 for this reset function.

Panoramic pictures have been taken using the camera apparatus of the invention with the scanner 14 rotating at a rate of 1,040° per second, the film advanced at a rate of 20 inches per second, and the width of slit 42 set at 0.074 inch. It will be appreciated that these values are merely representative and are not intended as limiting the invention.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described the invention, what is claimed as new and desired to secure by Letters Patent is:

1. A panoramic camera comprising, in combination:
   (A) an objective lens;
   (B) a viewfinder;
   (C) a first optical scanner stationed immediately in front of said objective lens;
   (D) a second optical scanner stationed immediately in front of said viewfinder,
   (1) said first and second scanners being of like construction, and
   (2) said second scanner capable of being rotated independently of said first scanner while observing through said viewfinder to visually compose a field to be photographed;
   (E) a film transport accommodating a film strip;
   (F) means forming an aperture stationed intermediate said lens and the film; and
   (G) a motor coupled to said first scanner and said film transport and operating to rotate said first scanner in synchronism with the advance of film past said aperture,
   (1) whereby to photograph a field having an angle determined by the degree of rotation of said first scanner.

2. The panoramic camera defined in claim 1, wherein
   (1) said first and second scanners are each double-dove scanners.

3. The panoramic camera defined in claim 1, which further includes
   (H) means providing a pair of adjustable stops for limiting the degree of rotation of said first scanner and to determine the angular locations of the edges of the field to be photographed relative to the axis of said objective lens.

4. The panoramic camera defined in claim 3 wherein said stop providing means comprises
   (1) a tab rotating with a shaft mounting said first scanner,
   (2) a first ring carrying a first stop against which said tab is rotated to conclude the scan of said first scanner and thus establish one edge of the field to be photographed,
      (a) said first ring rotated to vary the angular location of said first stop,
   (3) a second ring carrying a second stop against which said tab is rotated to establish the starting point of the scan of said first scanner and thus determine the other edge of the field,
      (a) said second ring rotated to adjust the angular position of said second stop.

5. The panoramic camera defined in claim 4, wherein said motor is an electric motor, and
   (1) said first stop carries a switch which is opened upon engagement by said tab to break an energization circuit for said motor.

6. The panoramic camera defined in claim 4, wherein said stop providing means further includes
   (1) a first pointer secured to said first ring,
   (2) a second pointer secured to said second ring, and
   (3) a scale associated with said first and second pointers to provide an indication of the angular positions of said first and second stops relative to the axis of said lens.

7. The panoramic camera defined in claim 6 which further includes:
   (I) a third pointer movable with said second scanner; and
   (J) a second scale associated with said third pointer for indicating the angular locations relative to said lens axis of the edges of the field to be photographed as observed through said viewfinder.
      (1) whereby to facilitate the angular positioning of said first and second stops using said first and second pointers and said first scale.

8. A panoramic camera comprising, in combination:
   (A) an objective lens;
   (B) an objective optical scanner stationed immediately in front of said objective lens, said scanner
      (1) mounted for rotation about an axis intersecting the axis of said lens at a right angle;
   (C) film transport accommodating a film strip;

(D) means forming an aperture stationed intermediate said lens and the film;

(E) a motor coupled to said scanner and said film transport for rotating said scanner through a field to be photographed in synchronism with the advance of film past said aperture; and (F) means providing first and second adjustably positioned stops for limiting the degree of angular rotation of said scanner and for determining the left and right margins of a field to be photographed.

9. The panoramic camera defined in claim 8 wherein;
(1) said aperture is in the form of an elongated slit extending transversely to the direction of advancement of the film.

10. The panoramic camera defined in claim 8, wherein
(1) said scanner is a double-dove scanner.

11. The panoramic camera defined in claim 8, wherein stop providing means comprises
(1) a tab rotating with a shaft mounting said scanner,
(2) a first ring carrying said first stop against which said tab is rotated to conclude a scan of said scanner and thus establish one margin of the field to be photographed,
    (a) said first ring rotated to vary the angular location of said first stop,
(3) a second ring carrying said second stop against which said tab is rotated to establish the starting point of the scan of said scanner and thus determine the other margin of the field,
    (a) said second ring rotated to adjust the angular position of said second stop.

12. The panoramic camera defined in claim 11 wherein said motor is an electric motor, and
(1) said first stop carries a switch which is opened upon engagement by said tab to break an energization circuit for said motor.

13. The panoramic camera defined in claim 11, wherein said stop providing means further includes
(1) a first pointer secured to said first ring,
(2) a second pointer secured to said second ring, and
(3) a scale associated with said first and second pointers to provide an indication of the angular positions of said first and second stops relative to the axis of said lens.

14. The panoramic camera defined in claim 8, wherein
(1) said scanner is capable of rotating through an arc sufficient to photograph a field included in an angle in excess of 180°.

15. The panoramic camera defined in claim 13, which further comprises:
(G) viewfinder means including
    (1) a telescope
    (2) a viewfinder scanner stationed immediately in front of said telescope,
        (a) said viewfinder scanner having the same optical properties as said objective scanner, and
        (b) said viewfinder scanner being rotated while observing through said telescope to visually compose a field to be photographed,
    (3) a third pointer movable with said viewfinder scanner, and
    (4) a second scale associated with said third pointer for indicating the angular locations relative to said lens axis of the margins of the field to be photographed as observed through said viewfinder,
        (a) whereby to facilitate the angular positioning of said first and second stops using said first and second pointers and said first scale.

References Cited
UNITED STATES PATENTS 3,217,623    11/1965    Hotchkiss    95—15 X
3,234,865    2/1966    Scott    95—15 X SAMUEL S. MATTHEWS, Primary Examiner R. L. MOSES, Assistant Examiner U.S. Cl. X.R.

95—12.5